(12) United States Patent
Satou

(10) Patent No.: US 10,245,934 B2
(45) Date of Patent: Apr. 2, 2019

(54) TORQUE ROD AND MANUFACTURING METHOD THEREOF

(71) Applicant: YAMASHITA RUBBER KABUSHIKI KAISHA, Fujimino-shi, Saitama (JP)

(72) Inventor: Yousuke Satou, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 19 days.

(21) Appl. No.: 14/915,962

(22) PCT Filed: Aug. 25, 2014

(86) PCT No.: PCT/JP2014/072130
§ 371 (c)(1),
(2) Date: Mar. 2, 2016

(87) PCT Pub. No.: WO2015/033812
PCT Pub. Date: Mar. 12, 2015

(65) Prior Publication Data
US 2016/0193907 A1 Jul. 7, 2016

(30) Foreign Application Priority Data
Sep. 6, 2013 (JP) .................................. 2013-185764

(51) Int. Cl.
*F16F 15/02* (2006.01)
*B60K 5/12* (2006.01)
(Continued)

(52) U.S. Cl.
CPC .......... *B60K 5/1208* (2013.01); *B60K 5/1216* (2013.01); *B60K 5/1241* (2013.01);
(Continued)

(58) Field of Classification Search
CPC .... F16F 1/3849; F16F 15/085; F16F 2236/12; F16F 2238/024; B60K 5/1208; B60K 55/1216; B60K 5/1241
See application file for complete search history.

(56) References Cited

U.S. PATENT DOCUMENTS

| 4,240,517 A * | 12/1980 | Harlow, Jr. ........ B60G 21/0551 180/295 |
| 4,403,762 A * | 9/1983 | Cogswell, II ........ B60K 5/1208 188/379 |
| 2015/0053496 A1* | 2/2015 | Jomaa ..................... G06F 17/50 180/292 |

FOREIGN PATENT DOCUMENTS

| JP | 2007-333029 | 12/2007 |
| JP | 2009-185883 | 8/2009 |

(Continued)

OTHER PUBLICATIONS

International Search Report, dated Sep. 16, 2014 (Sep. 16, 2014).

*Primary Examiner* — Bradley T King
(74) *Attorney, Agent, or Firm* — Rankin, Hill & Clark LLP

(57) ABSTRACT

A torque rod includes a small ring section to be connected to an engine, a large ring section to be connected to a vehicle body, and a rod section providing a connection between the small ring section and the large ring section. The large ring section includes an outer member connected to the rod section, an inner member to be connected to the vehicle body, and a large ring elastic member providing a connection between the outer member and the inner member. Based on a transmission characteristic map, which is prepared by mapping transmission characteristics of the torque rod that are determined by a rod length, a small ring torsion spring, a large ring spring and a large ring spring ratio as param- (Continued)

eters, such a combination of parameters that the transmission characteristics are less than 100 N/mm is selected.

15 Claims, 9 Drawing Sheets

(51) Int. Cl.
*F16F 1/38* (2006.01)
*F16F 15/08* (2006.01)

(52) U.S. Cl.
CPC .......... *F16F 1/3849* (2013.01); *F16F 15/085* (2013.01); *F16F 2236/12* (2013.01); *F16F 2238/024* (2013.01)

(56) References Cited

FOREIGN PATENT DOCUMENTS

| | | |
|---|---|---|
| JP | 2012-057677 | 3/2012 |
| JP | 2012-057679 | 3/2012 |

\* cited by examiner

Fig.2
(A)
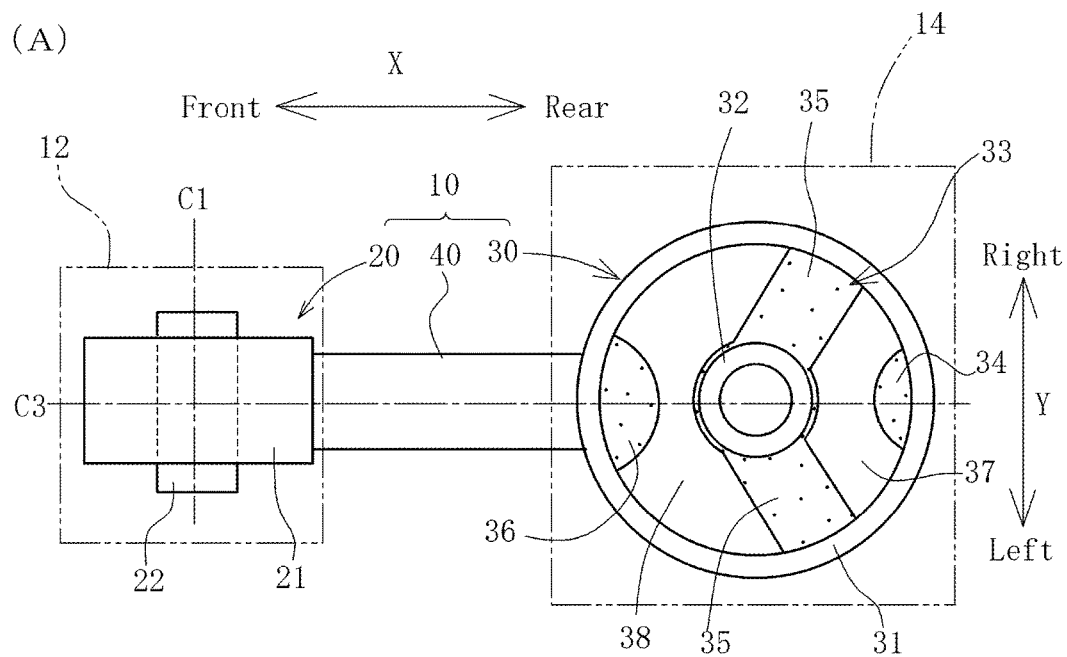
(B)
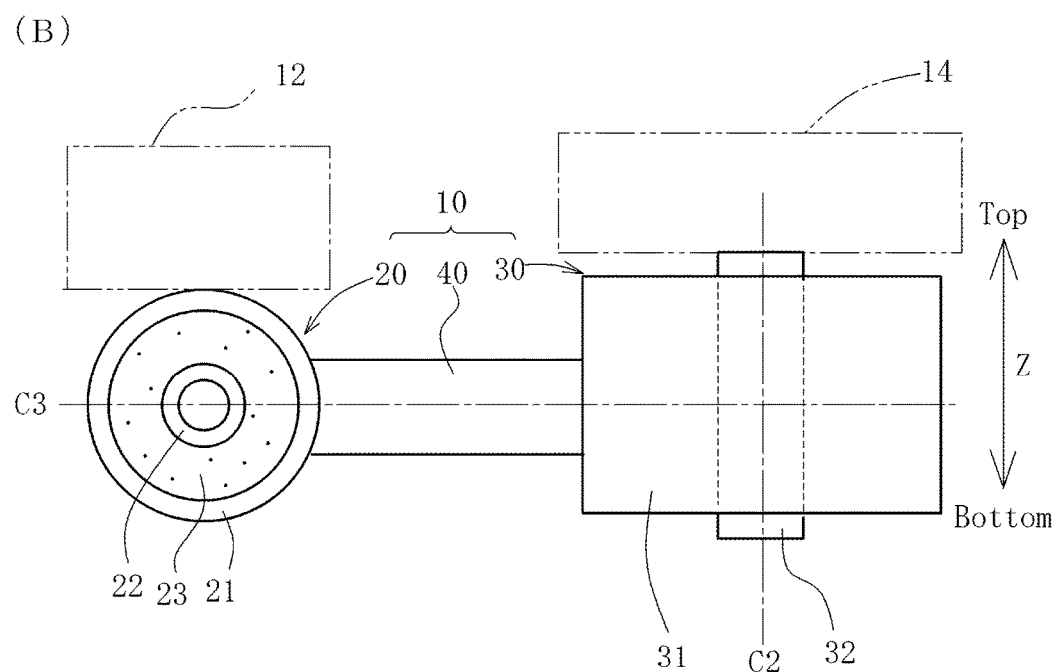

Fig.4
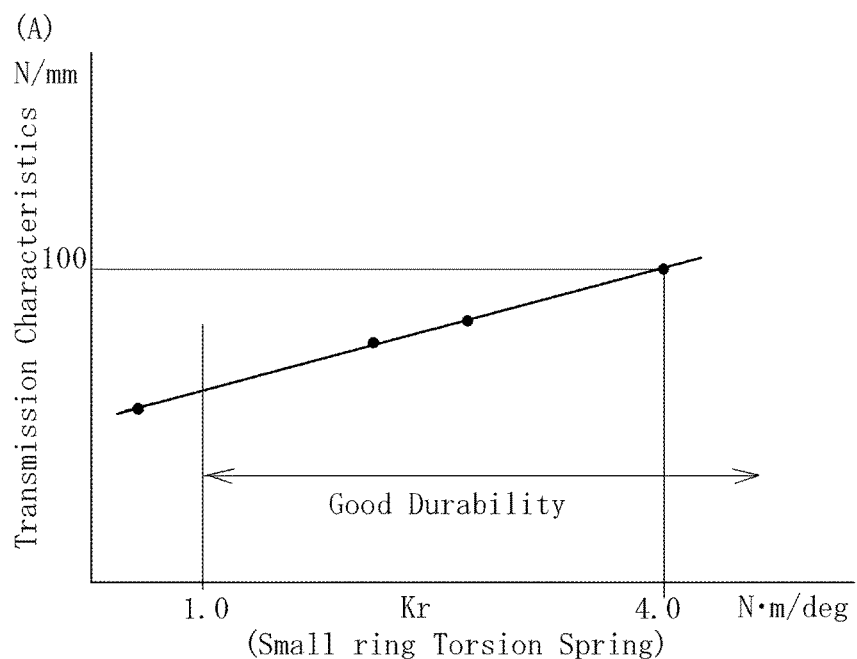
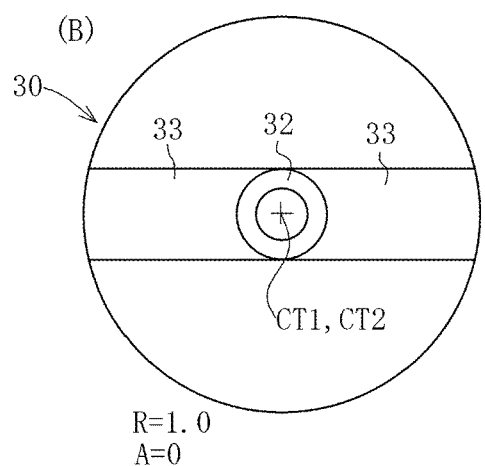
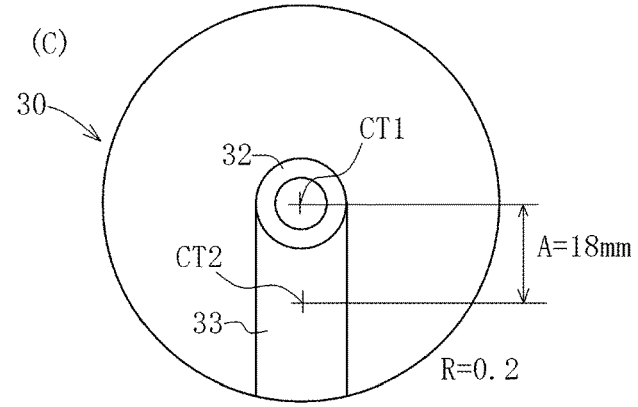

Fig.5

Rod Length 225mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | | | | | | | |
| 0.4 | | | | | | | |
| 0.5 | | | | | | | |
| 0.6 | | | | | | | |
| 0.7 | | | | | | | |
| 0.8 | | | | | | | |
| 0.9 | | | | | | | |
| 1.0 | | | | | | | |

Rod Length 200mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | | | | | | | |
| 0.4 | | | | | | | |
| 0.5 | | | | | | | |
| 0.6 | | | | | | | |
| 0.7 | | | | | | | |
| 0.8 | | | | | | | |
| 0.9 | | | | | | | |
| 1.0 | ▓ | ▓ | ▓ | ▓ | ▓ | ▓ | ▓ |

Rod Length 175mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | | | | | | | |
| 0.4 | | | | | | | |
| 0.5 | | | | | | | |
| 0.6 | | | | | | | |
| 0.7 | | | | | | | |
| 0.8 | ▓ | ▓ | | | | | |
| 0.9 | ▓ | ▓ | ▓ | ▓ | ▓ | | |
| 1.0 | ▓ | ▓ | ▓ | ▓ | ▓ | ▓ | ▓ |

Rod Length 150mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | | | | | | | |
| 0.4 | | | | | | | |
| 0.5 | | | | | | | |
| 0.6 | | | | | | | |
| 0.7 | ▓ | ▓ | ▓ | | | | |
| 0.8 | ▓ | ▓ | ▓ | ▓ | ▓ | ▓ | ▓ |
| 0.9 | ▓ | ▓ | ▓ | ▓ | ▓ | ▓ | ▓ |
| 1.0 | ▓ | ▓ | ▓ | ▓ | ▓ | ▓ | ▓ |

Rod Length 125mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | | | | | | | |
| 0.4 | | | | | | | |
| 0.5 | ▓ | | | | | | |
| 0.6 | ▓ | ▓ | ▓ | | | | |
| 0.7 | ▓ | ▓ | ▓ | ▓ | ▓ | | |
| 0.8 | ▓ | ▓ | ▓ | ▓ | ▓ | ▓ | ▓ |
| 0.9 | ▓ | ▓ | ▓ | ▓ | ▓ | ▓ | ▓ |
| 1.0 | | | | ▓ | ▓ | ▓ | ▓ |

Rod Length 100mm Large Ring Spring 105N/mm

| Large Ring Spring Ratio | Small Ring Torsion Spring Kr | | | | | | |
|---|---|---|---|---|---|---|---|
| | 1.0 | 1.5 | 2.0 | 2.5 | 3.0 | 3.5 | 4.0 |
| 0.2 | ▓ | | | | | | |
| 0.3 | ▓ | | | | | | |
| 0.4 | ▓ | | | | | | |
| 0.5 | ▓ | ▓ | | | | | |
| 0.6 | ▓ | ▓ | ▓ | ▓ | | | |
| 0.7 | ▓ | ▓ | ▓ | ▓ | ▓ | ▓ | ▓ |
| 0.8 | | | ▓ | ▓ | ▓ | ▓ | ▓ |
| 0.9 | | | | | ▓ | ▓ | ▓ |
| 1.0 | | | | | | | |

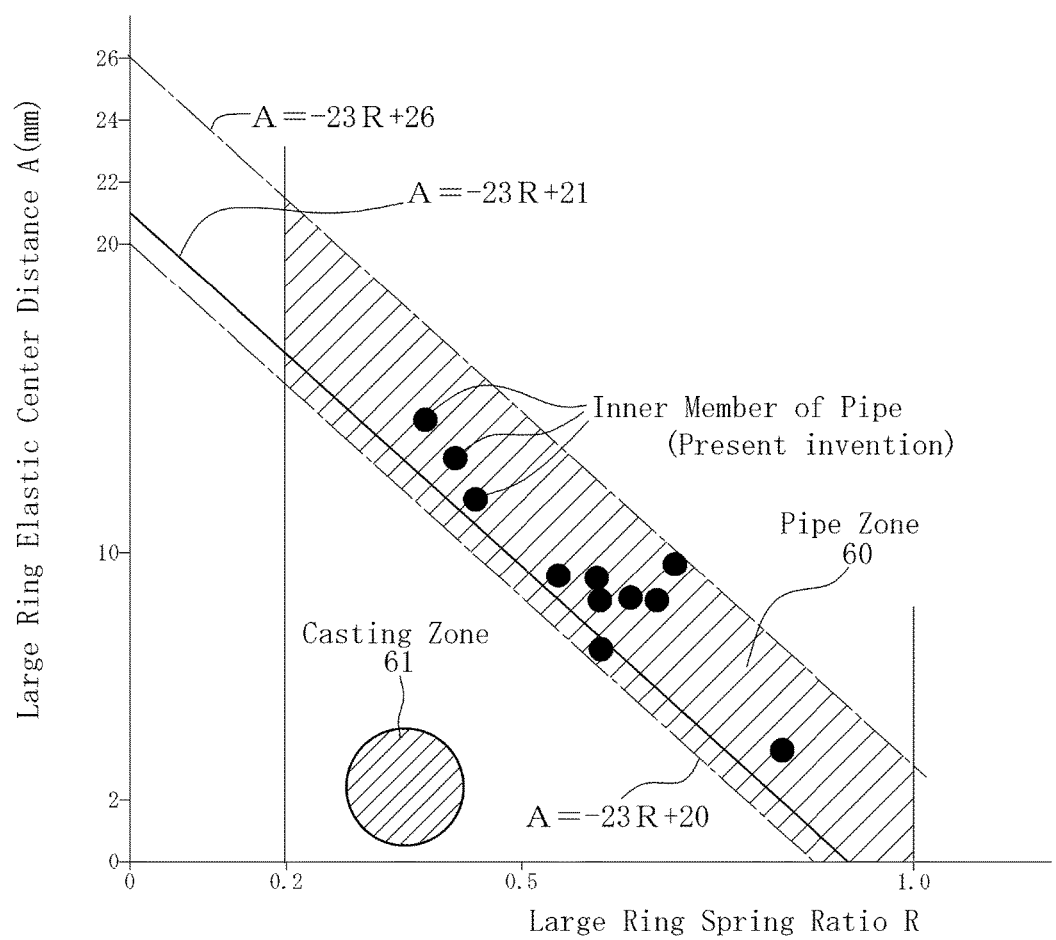

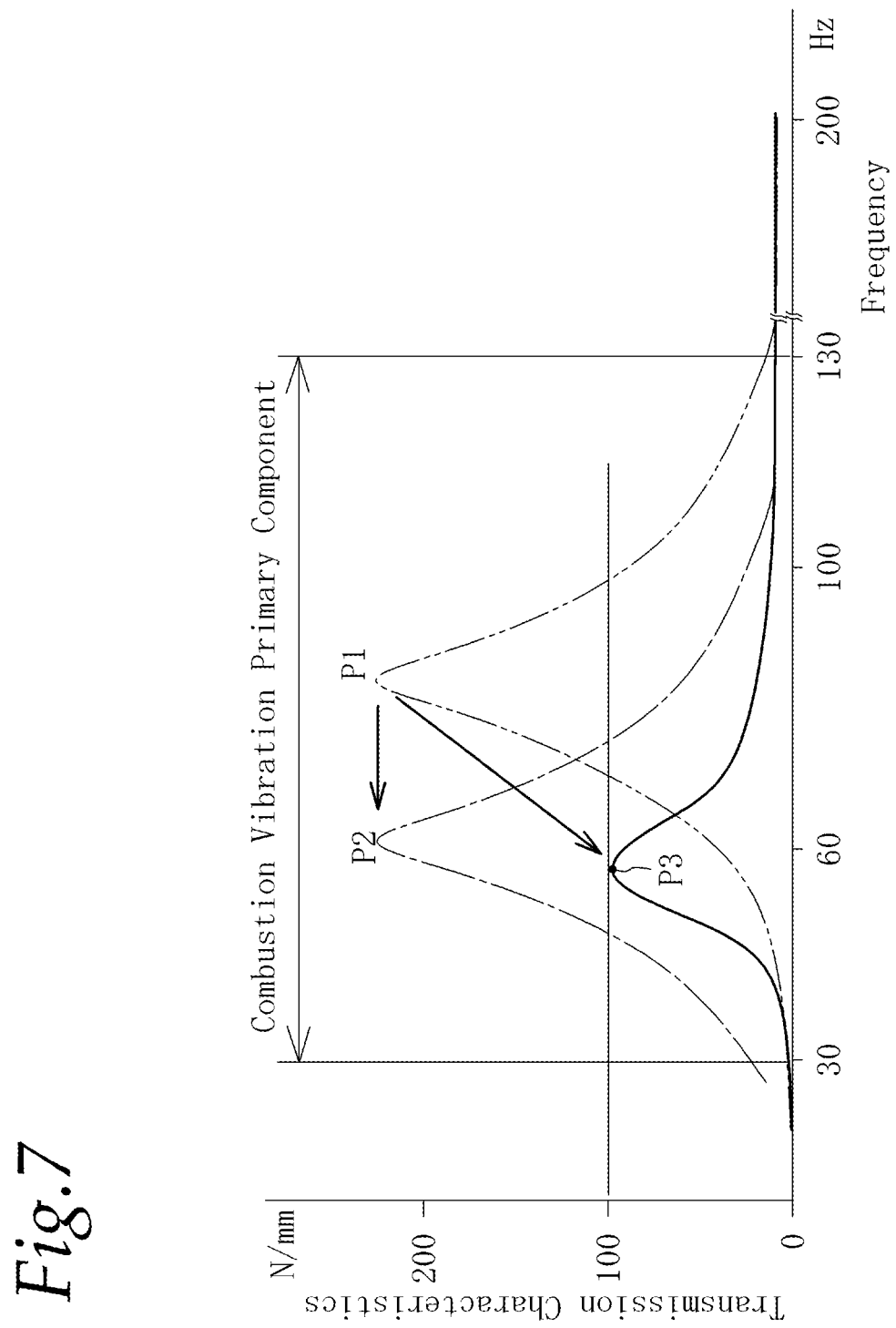

TORQUE ROD AND MANUFACTURING METHOD THEREOF

TECHNICAL FIELD

The present invention relates to a torque rod for providing a connection between an engine and a vehicle body in a vibration isolating manner and a manufacturing method thereof.

BACKGROUND ART

FIGS. 1 and 2 show a torque rod in accordance with the present invention, and a whole structure is schematically illustrated as a structure of a general torque rod. FIG. 1(A) is a perspective view of the torque rod. FIG. 1(B) is a schematic view showing a state of an engine being supported in a vibration isolating manner. FIG. 2(A) is a plan view of the torque rod, and FIG. 2(B) is a front view thereof.

In the following description of the present invention, each orientation such as front, rear, left, right, upper side and lower side shall be determined based on each direction of the vehicle onto which the engine is loaded. In particular, with respect to forward and rearward directions of a large ring section, the side of a small ring section shall be a forward direction.

A torque rod 10 of general type, as shown in FIG. 1(B) is used as a lower mount which is arranged below an engine 12 in order for providing a connection between a lower part of the engine 12 and a vehicle body.

The engine 12 is arranged transversely, and upper and lower sides thereof are supported by an upper mount 50 and the torque rod 10. The engine 12 is supported by a supporting structure of pendulum type such that both of left and right sides of a principal axis of inertia extending in the vehicle width direction are supported by side mounts (each of which is not shown in the drawing) and the engine 12 which pitches around the principal axis of inertia is supported by the above-referred various kinds of engine mounts.

The torque rod 10 functioning as the lower mount is provided for suppressing the pitching motion. At the time of pitching, the load is inputted into the torque rod so as to pull it forwardly.

This torque rod 10 includes a rod section 40 formed of a long member such as a rod member, a small ring section 20 and a large ring section 30 formed in both ends in the longitudinal direction of the rod section 40. The small ring section 20 is connected to the engine 12, and the large ring section 30 is connected to a vehicle body 14.

As shown in FIG. 1(A), the small ring section 20 is provided with a cylindrical outer member 21 connected to the rod section 40, a cylindrical small ring inner member 22 to be connected to the engine 12, and a small ring elastic member 23 of rubber, etc. providing a connection between the cylindrical outer member and the cylindrical small ring inner member.

The large ring section is provided with a cylindrical large ring outer member 31 connected to the rod section 40, a cylindrical large ring inner member 32 to be connected to the vehicle body 14, and a large ring elastic member 33 of rubber, etc. providing a connection between the cylindrical large ring outer member and the cylindrical large ring inner member.

Herein, letting a center axis of the small ring inner member 22 be C1, a center axis of the large ring inner member 32 be C2, and a center axis of the rod section 40 be C3, these axes intersect at right angles to each other. The center axis C1 shall be arranged in alignment with the left and right direction Y of the vehicle. The axis C2 shall be arranged in alignment with the upward and downward direction Z of the vehicle, and the center axis C3 shall be arranged in alignment with the forward and rearward direction X thereof.

The torque rod 10 is of torsion type in which the small ring inner member 22 of the small ring section 20 and the inner member 32 of the large ring section 30 each are inclined or twisted at 90° about the direction of the center axis C3 of the rod section 40.

Although this torque rod 10, originally, is a vibration isolating device for preventing the vibrations of the engine 12 from being transmitted to the vehicle body 14, it is known that the vehicle body 14 resonates due to the rigid body resonance of the torque rod 10 to thereby produce harsh noises (booming noise).

This is because a predetermined vehicle body resonance frequency range exists in the vehicle body 14 and the vehicle body 14 resonates when the rigid body resonance of the torque rod 10 is produced at this vehicle body resonance frequency range and transmitted from the large ring section 30 to the vehicle body 14.

Therefore, it is desired to reduce the noises on the vehicle body side due to the rigid body resonance of the torque rod 10, and methods for decreasing, in the vehicle body resonance frequency range, the transmission of the frequencies from the large ring section 30 of the torque rod 10 to the vehicle 14 have been examined.

As an example of such methods, there is disclosed a method in which a center of gravity of the torque rod 10 is offset from a straight line connecting the axes of the small ring section 20 and the large ring section 30 by locating a weight in the outer member 31 of the large ring section 30 or by other ways so that the vibrations in the bounce direction and the pitch direction are cancelled by the vibrations in the roll direction (method 1: see a patent reference 1).

Further, it is also known that a peak (see P1, P2 of FIG. 7) of the rigid body resonance in the direction to be transmitted from the large ring section 30 to the vehicle body is varied in such a way as to be shifted from the vehicle body resonance frequency range (method 2).

However, in the above method 1, the resonance peak in a resonance system of the weight has to be adjusted to overlap with the vehicle body resonance frequency range. Namely, since different specifications are prepared for each of vehicle models, the adjustment of the weight must be performed every time a combination between the engine and the vehicle is changed due to differences of the vehicles. Thus, this method is poor in versatility.

Further, in the method 2, as shown in FIG. 7, the peak of the rigid body resonance is merely shifted in parallel from P1 of the vehicle body resonance frequency range to P2 of a low frequency side. Therefore, when the construction and the like of the vehicle are changed due to the differences of the vehicles and the vehicle body resonance frequency range is shifted to the position of P2, the design of torque rod must be changed again such that the resonance peak is shifted accordingly. Thus, this method is also poor in versatility.

To improve this versatility, it is conceivable to make it difficult to transmit the vibrations from the inner member 32 of the large ring section 30 to the vehicle body 14 in the frequency range of 30-200 Hz corresponding to a primary component of frequency by the combustion of the engine. To be concrete, it is known that it is realizable if the transmission characteristics which are a capacity of frequency transmission in the resonance peak are less than 100 N/mm. Herein, the resonance having the transmission characteristics which are less than 100 N/mm shall be referred to as flat characteristics.

The torque rod of such flat characteristics is publicly known. In FIG. 8, a large ring section 130 in the prior art example of such torque rod is shown and is viewed from the direction of a mounting shaft of an inner member 132. This large ring section 130 has a large ring elastic member 133 which elastically connects an outer member 131 and the inner member 132. The inner member 132 is made of metal casting and has a special shape of substantially a triangle.

The inner member 132 is connected to the vehicle body side by a bolt as the mounting shaft. A center of the inner member 132 is designated as a fastening center CT1. Moreover, a center of a spring in the forward and rearward direction of the large ring elastic member 133 is designated as an elastic center CT2. A distance between the fastening center CT1 and the elastic center CT2 is designated as a large ring elastic center distance A (it is positive when the elastic center CT2 is located at the rear of the fastening center CT1).

With this arrangement, the fastening center CT1 comes close to the elastic center CT2 and the large ring elastic center distance is decreased, so that the large ring elastic center distance and a large ring spring ratio R can be comparatively small in such a condition as to fall within a casting zone 61 of FIG. 6 to be referred to later. Therefore, the small transmission characteristics of less than 100 N/mm are realized in combination with a greatly weakened torsion spring of a small ring section to be referred to later.

PRIOR ART REFERENCE

Patent reference 1: Japanese Patent Application Laid-open Publication No. 2009-185883.

DISCLOSURE OF THE INVENTION

Problem to be Solved by the Invention

By the way, when considering the decrease of the transmission characteristics, it is conceivable that, in the torque rod 10 of torsion type, a torsion spring Kr of the small ring elastic member 23 of the small ring section 20 is lessened since the small ring section 20 is twisted around the small ring inner member as a torsion center and this torsion is transmitted to the large ring section 30 when the vibrations is transmitted from the engine 12 to the vehicle body 14.

Further, it is conceivable that the spring (hereinafter, referred to as spring in the upward and downward direction) in the axial direction of the large ring elastic member 33 is lessened since the vibration transmitted to the torque rod 10 is transmitted from the inner member 32 of the large ring section 30 to the vehicle body 14. Herein, it is required for the large ring elastic member 33 to increase the spring (hereinafter, referred to as spring in the forward and rearward direction or spring in the axial direction of the rod section) in the axial direction of the rod section 40. Therefore, letting the large ring spring ratio R be the spring in the upward downward direction/the spring in the forward rearward direction, then this large ring spring ratio R has to be lessened as far as possible.

In the prior art example as shown in FIG. 8, the comparatively small large ring spring ratio is realized in such a manner that the torsion spring Kr of the small ring elastic member is less than 1.0 to obtain the greatly weak spring, and the inner member 132 of the large ring section 130 is formed in a special shape. Thus, the small transmission characteristics of less than 100 N/mm are realized. In addition, the small large ring center distance is realized by forming the inner member 132 into the special shape.

By the way, in the case where the spring of the large ring elastic member is lessened excessively, or the balance with respect to the large ring spring ratio is not adjusted, the small ring elastic member and the large ring elastic member 133 become easy to be broken whereby the durability may be injured. Therefore, in order to enhance the durability of the small ring elastic member and the large ring elastic member, the construction that is able to realize the small transmission characteristics of less than 100 N/mm by increasing the torsion spring Kr of the small ring elastic member to a certain extent and by allowing the large ring spring ratio R to fall within a proper range is required.

Moreover, in the case of using the inner member 132 of special shape like this, the inner member 132 becomes larger in size and is increased in weight, and there is a great increase in costs for manufacture by casting. Accordingly, it is desirable to use such a low-priced and light inner member made of metallic round pipe as to be obtainable as a commonplace article on the market. However, in the case of using the inner member of round pipe like this, the fastening center CT1 and the elastic center CT2 are separated apart from each other on a large scale.

For example, in order to realize the large ring spring ratio R and the large ring center distance A similar to the prior art example of FIG. 8 by the inner member made of round pipe, a large ring section 130A is formed with a large ring elastic member 133A of substantially V-shape and an inner member 132A of round pipe located in the vicinity of a projecting portion 133B which is a center of the large ring elastic member 133A, as shown in FIG. 9. In order to realize the large ring center distance A similar to the prior art example, the inner member 132A of round pipe is arranged to be offset rearwardly (downwardly in FIG. 9) from the projecting portion 133B. In a state like this, the inner member 132A does not function virtually as a member for elastically deforming the large ring elastic member 133A and so the configuration of the large ring section 130A is not suitable to be materialized.

Accordingly, even in the case of using the inner member of round pipe, it is required that, by optimizing the large ring spring ratio and the large ring elastic center distance, the small transmission characteristics of less than 100 N/mm are realized. In addition, the lightening in weight and decrease in costs have to be realized. Therefore, it is an object of the present invention to realize the above requirements.

Means for Solving the Problem

To achieve the above described object, a torque rod according to a first feature of the present invention comprises a small ring section (20) to be connected to an engine (12), a large ring section (30) to be connected to a vehicle body (14), and a rod section (40) providing a connection between the small ring section (20) and the large ring section (30), the small ring section (20) including an outer member (21) connected to the rod section (40), a small ring inner member (22) to be connected to the engine (12), and a small ring elastic member (23) providing a connection between the outer member (21) and the small ring inner member (22), and the large ring section (30) including an outer member (31) connected to the rod section (40), an inner member (32)

to be connected to the vehicle body (14), and a large ring elastic member (33) providing a connection between the outer member (31) and the inner member (32), wherein large ring transmission characteristics relative to magnitude of transmission force transmitted from the large ring section (30) to the vehicle body (14) are of flat characteristics whose peak value is less than 100 N/mm, and wherein a combination between a small ring torsion spring which is a spring at the time of torsion applied to the small ring elastic member (23) of the small ring section (20) and a large ring spring ratio which is a ratio of a spring in the axial direction of the inner member (32) of the large ring section (33) with respect to a spring in the axial direction of the rod section (40) is configured such that transmission characteristics in a transmission characteristic map which is obtained by mapping transmission characteristics of the torque rod, which are predetermined by using a rod length, the small ring torsion spring, the large ring spring ratio and a large ring spring value as parameters are less than 100 N/mm.

According to a second feature of the present invention, in addition to the first feature, the inner member (32) of the large ring section (30) is made of pipe.

According to a third feature of the present invention, in addition to the second feature, the inner member (32) of the large ring section (30) is made of round pipe.

According to a fourth feature of the present invention, in addition to the second or third feature, the large ring spring ratio and a large ring elastic center distance which is a distance between an elastic center of the large ring elastic member (33) and a fastening center of the inner member (32) with respect to the vehicle body fall within a predetermined pipe zone (60) which is previously determined by an experimentation.

According to a fifth feature of the present invention, in addition to the fourth feature, the pipe zone is a zone bounded by the large ring spring ratios of R=0.2~1.0, a straight line of A=−23R+21 and straight lines extending in parallel with the straight line of A=−23R+21 in a graph representing the large ring elastic center distance (A) on the vertical axis and the large ring spring ratio (R) on the horizontal axis.

According to a sixth feature of the present invention, in addition to any one of first to fifth features, the outer member (21) of the small ring section and the outer member (31) of the large ring section are made of resin and formed integral with the rod section (40).

According to a seventh feature of the present invention, in addition to any one of the first to sixth features, the torque rod is arranged below the engine and used as a lower mount in which the outer member (31) of the large ring section (30) receives force in such a way as to be moved relatively forwardly with respect to the inner member (32) by vibrations of the engine. The large ring elastic member (33) is formed integral with the inner member (32) and has a forwardly projecting configuration of substantially V-shape.

According to an eighth feature of the present invention, in addition to any one of the first to seventh features, a center axis (C1) of the small ring section (20) and a center axis (C2) of the large ring section (30) are inclined to each other at an angle of 90°.

According to a ninth feature of the present invention, a method of manufacturing a torque rod, the torque rod comprising a small ring section (20) to be connected to an engine (12), a large ring section (30) to be connected to a vehicle body (14), and a rod section (40) providing a connection between the small ring section (20) and the large ring section (30), the small ring section (20) including an outer member (21) connected to the rod section (40), a small ring inner member (22) to be connected to the engine (12), and a small ring elastic member (23) providing a connection between the outer member (21) and the small ring inner member (22), and the large ring section (30) including an outer member (31) connected to the rod section (40), an inner member (32) to be connected to the vehicle body (14), and a large ring elastic member (33) providing a connection between the outer member (31) and the inner member (32), wherein large ring transmission characteristics relative to magnitude of transmission force transmitted from the large ring section (30) to the vehicle body (14) are of flat characteristics whose peak value is less than 100 N/mm, wherein letting a spring at the time of torsion applied to the small ring elastic member (23) of the small ring section (20) be a small ring torsion spring, and a ratio of a spring in the axial direction of the inner member (32) of the large ring section (33) with respect to a spring in the axial direction of the rod section (40) be a large ring spring ratio, the torque rod is designed by using a rod length, the small ring torsion spring, a large ring spring and the large ring spring ratio as parameters, and wherein, first, specific rod length and large ring spring are determined, and, next, based on a transmission characteristic map which comprises transmission characteristics of the torque rod corresponding to changes in the small ring torsion spring and the large ring spring ratio which are predetermined for each of the rod lengths and each of the large ring springs, the small ring torsion spring and the large ring spring ratio are determined from such combination between the small ring torsion spring and the large ring spring ratio that the transmission characteristics in the transmission characteristic map in the specific rod length and large ring spring are less than 100 N/mm.

Effects of the Invention

According to the first feature of the present invention, by selecting such combination between the small ring torsion spring and the large ring spring ratio that transmission characteristics in the transmission characteristic map in the specific rod length and large ring spring are less than 100 N/mm, it is possible to realize the torque rod which is durable and has such flat characteristics that the peak value of the transmission characteristics is less than 100 N/mm. In addition, the small ring torsion spring and the large ring spring ratio which are used as the parameters can be easily determined or fixed.

According to the second feature of the present invention, since the inner member (32) of the large ring section (30) is made of pipe, there is no need to use the inner member of special deformed shape. Therefore, cost reduction can be achieved while obtaining the torque rod which is durable and has the flat characteristics.

According to the third feature of the present invention, since the cheap round pipe member is used for the inner member (32) of the large ring section (30), the costs can be further lowered.

According to the fourth feature of the present invention, the large ring elastic center distance is set up falling within the predetermined pipe zone, whereby the use of the inner member made of pipe (containing the round pipe) has become possible.

According to the fifth feature of the present invention, in the graph representing the large ring elastic center distance (A) on the vertical axis and the large ring spring ratio (R) on the horizontal axis, the zone bounded by the large ring spring ratios of R=0.2~1.0, the straight line of A=−23R+21 and the straight lines extending in parallel with the straight line A=−23R+21 can be set up as the pipe zone.

According to the sixth feature of the present invention, since each of the outer members (21) and (31) of the small ring section (20) and the large ring section (30) is made of resin and formed integral with the rod section (40), the manufacturing can be facilitated in comparison with the case where these components are formed separately. In addition, the degree of freedom relative to the shape of the outer member (31) of the large ring section (30) can be increased.

According to the seventh feature of the present invention, the torque rod is arranged below the engine as a lower mount, and the outer member (31) of the large ring section (30) receives force in such a way as to be moved relatively forwardly with respect to the inner member (32) by the vibrations of the engine. However, since the large ring elastic member (33) projects forwardly in substantially a V-shaped fashion in such a condition as to be deformed in the direction of tension, the durability can be improved. Therefore, it becomes suitable for the lower mount.

According to the eighth feature of the present invention, since the center axis (C1) of the small ring section (20) and the center axis (C2) of the large ring section (30) are inclined to each other at an angle of 90°, the torque rod is formed in the torsion type whereby it is possible to increase absorption of vibrations by the small ring torsion spring of the small ring section (20).

According to the ninth feature of the present invention, the rod length, the small ring torsion spring, the large ring spring and the large ring spring ratio are used as parameters, and the rod length and the large ring spring are determined first by using the transmission characteristic map previously determined for each of the rod lengths and the large ring springs. Like this, from the transmission characteristic map corresponding to these rod lengths and the large ring springs, it is possible to determine the combination between the small ring torsion spring and the large ring spring ratio such that the transmission characteristics are less than 100 N/mm. Therefore, when designing the torque rod by using the rod length, the small ring torsion spring, the large ring spring and the large ring spring ratio as parameters, the small ring torsion spring and the large ring spring ratio for realizing the durable flat characteristics can be easily and rapidly determined or fixed.

BRIEF DESCRIPTION OF THE DRAWINGS

FIG. 2(A) is a plan view of the above torque rod and (B) is a front view thereof;

FIG. 4 is diagrams of assistance in explaining the setting of a small ring torsion spring and a large ring spring ratio;

FIG. 5 is graphs showing transmission characteristics;

FIG. 6 is a correlation diagram between a large ring spring ratio R and a large ring elastic center distance A when using an inner member made of a round pipe;

FIG. 7 is a graph showing frequency characteristics of transmission characteristics;

BEST MODE FOR CARRYING OUT THE INVENTION

Figure 1:
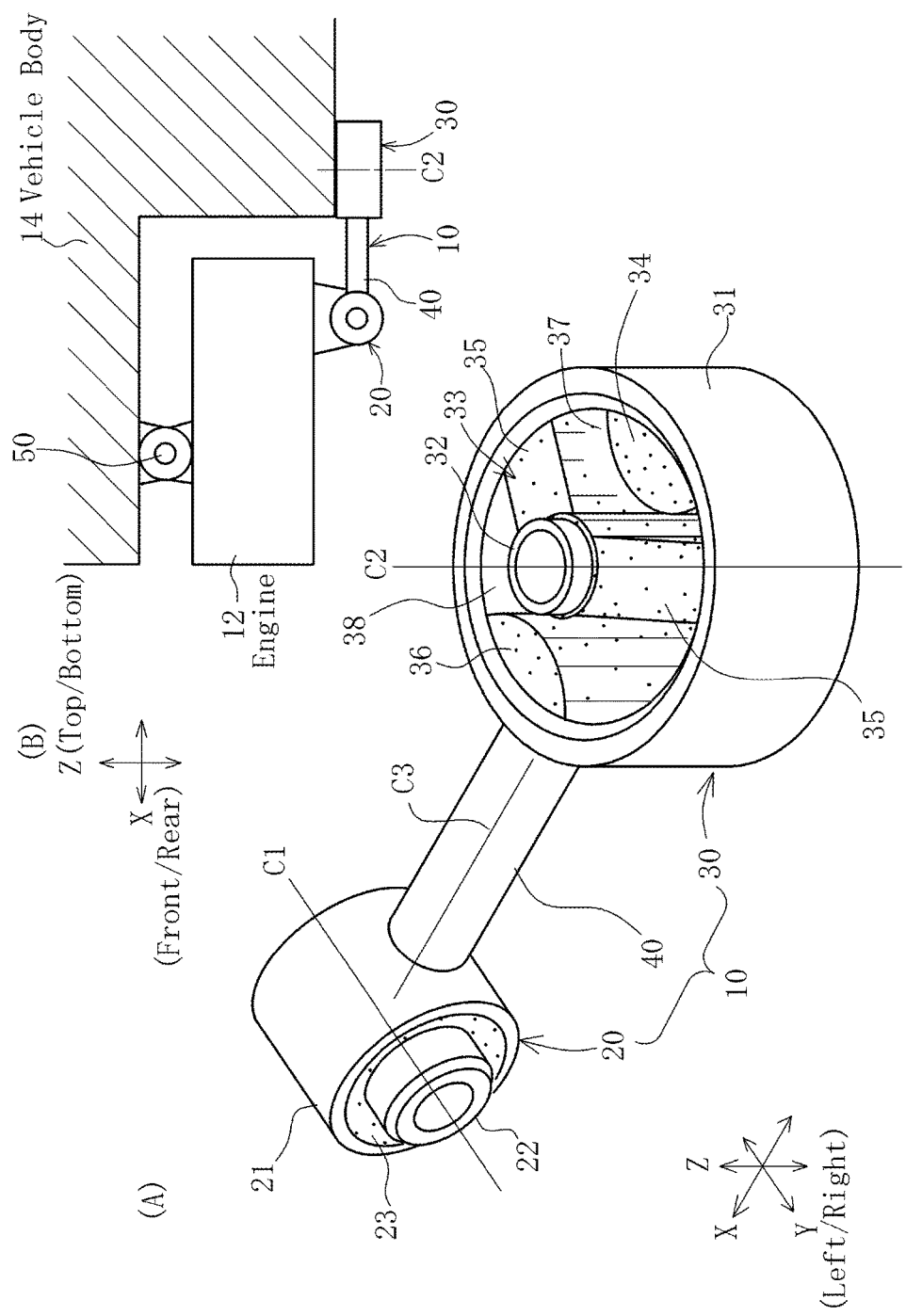
FIG. 1 is a perspective view of a torque rod which has a common structure.

Referring to FIGS. 1 and 2, an outline of a torque rod 10 according to the present invention will be explained first. However, a structure in external appearance is the same as those explained in the above background art, and there are differences only in values of transmission characteristics and parameters such as a large ring spring ratio, a large ring elastic center distance and the like. Therefore, the explanation with respect to like or corresponding parts in the structure in external appearance will be omitted, and so details and features will be explained hereunder.

Outer members 21, 31 and a rod section 40 are made of proper light materials such as synthetic resin and the like which have a lower specific gravity than aluminum and formed integral with each other. This torque rod is manufactured by a publicly known method such that a preliminary molding integrally formed with a small ring inner member 22, a small ring elastic member 23 and a large ring inner member 32 by vulcanization molding process or the like is arranged in a metallic mold and the synthetic resin is injected into the periphery of the preliminary molding to thereby integrally combine the outer members 21 and 31 into a single unit.

A large ring elastic member 33 is provided with a rear stopper 34, a main spring portion 35 and a front stopper 36. Spaces 37, 38 are formed between the rear stopper 34 and the main spring portion 35 and between the main spring portion 35 and the front stopper 36. The main spring portion 35 is a spring portion functioning as a vibration isolating main body in the vibration transmission from a large ring section 30 to a vehicle body 14 when the large ring section 30 is vibrated in the upward and downward directions by the vibration input from an engine 12.

In the torque rod 10 of lower mount type, the main spring portion 35 is arranged to project forwardly in the shape of V. Since, by pitching of the engine 12, a load in the direction to be pulled forwardly is inputted onto the torque rod 10, the outer member 31 tries to move forwardly and the inner member 32 moves rearwardly relative to the outer member 31. Therefore, the main spring portion 35 is deformed mainly by compressive deformation and produces a great spring. Accordingly, the forwardly projecting configuration in the shape of V is preferable to the torque rod 10 of lower mount type in the supporting structure of pendulum type. Herein, the main spring portion 35 is not limited to V-shape, and various shapes may be adopted.

By the way, the engine 12 and the vehicle body 14 are shown in a simplified fashion. In addition, although in small ring section 20 and the large ring section 30, the outer members 21, 31 and inner members 22, 32 each are made of a round pipe of orthogonally circular cross section formed by cutting the round pipe in the direction orthogonal to the axis at a predetermined length in the longitudinal direction, these are not limited to a circular cylindrical shape, and proper shapes such as a non-circular cylindrical shape or the like containing a polygonal shape in orthogonal cross section may be employed.

Herein, the pipe is a hollow long member which is uniform in thickness and which is manufactured by drawing, electric resistance welding, cutting and the like. Those which are made of a pipe mean those which are formed from a pipe.

Next, the setting of principal parameters necessary for designing the torque rod will be explained.

The torque rods, in accordance with required specifications, are determined or fixed by changing variously the rod length, the weight, the small ring spring, the small ring torsion spring, the large ring spring, the large ring spring ratio, the large ring elastic center distance, etc. to be used as parameters.

Figure 3:
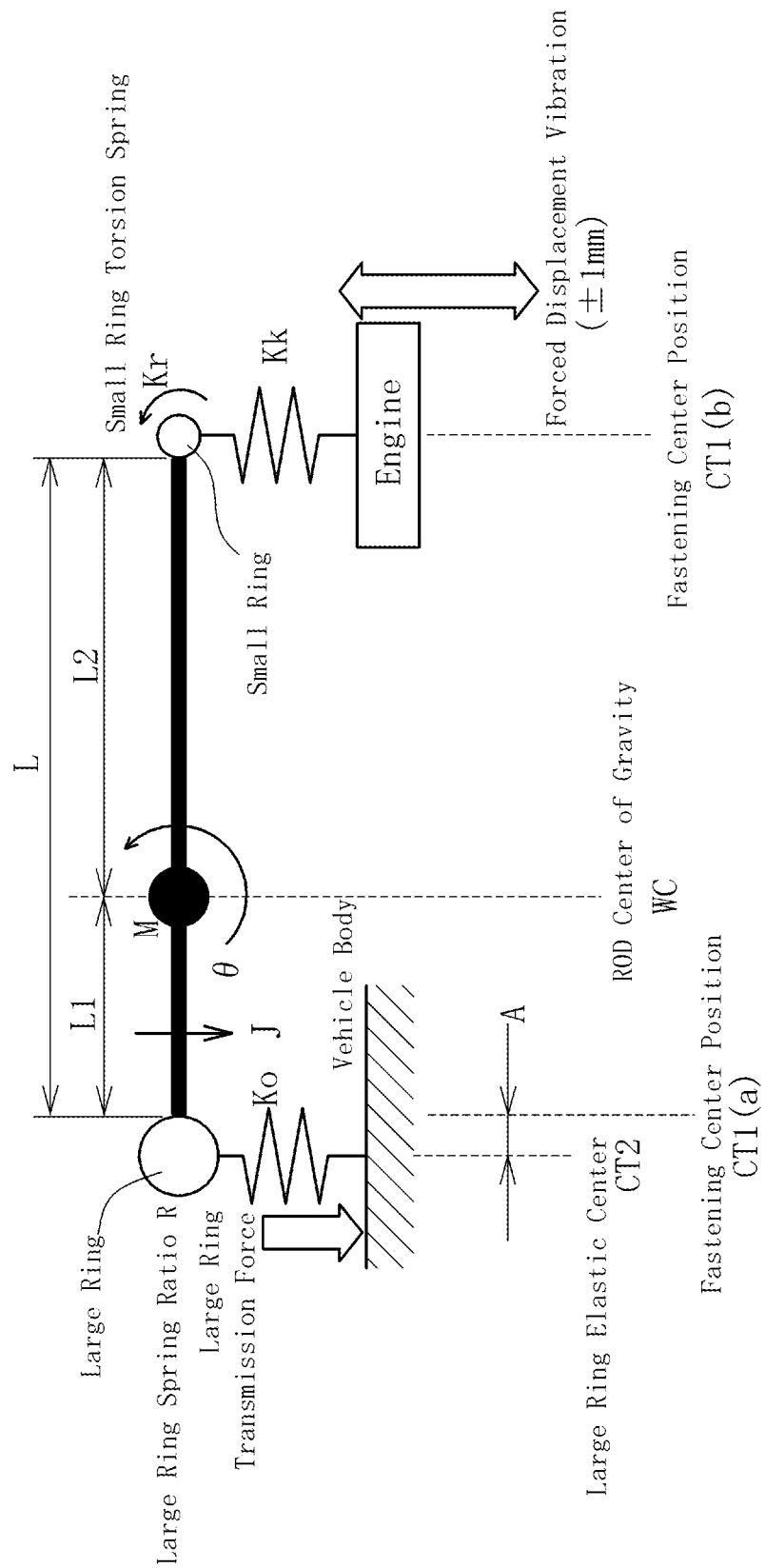
FIG. 3 is a schematic illustration showing principal parameters of the torque rod.

FIG. 3 shows a simplified model for calculating the transmission characteristics of this torque rod 10.

Moreover, the principal parameters necessary for designing this torque rod are defined in this drawing.

The transmission characteristics are measured as transmission force in the direction of a center axis C2 (in the upward and downward direction) transmitted to the inner member 32 of the large ring section 30 by applying forced displacement of ±1 mm to the small ring inner member 22 of the small ring section 20 with a vibration exciter. At that time, when exciting the small ring inner member 22 of the small ring section 20, the excitation load is transmitted through the small ring elastic member 23 to the rod section 40, and at the same time, in the large ring section, it is transmitted through the large ring elastic member 33 to the inner member 32.

In this vibration transmission route, the excitation load is absorbed first by the small ring elastic member 22 and then absorbed by the large ring elastic member 33. The deformation of the small ring elastic member 23 is mainly composed of the torsion due to the rotation of the rod section 40. Therefore, the small ring spring Kk and the small ring torsion spring Kr become essential.

The large ring section 30 is deformed mainly in the forward and rearward direction and in the upward and downward direction by the torsion of the outer member 31 due to the rotation of the rod section 40. Therefore, the large ring spring Ko and the large ring spring ratio R become essential. The large ring spring ratio R is a ratio of the spring in the upward and downward direction to the spring in the forward and rearward direction and is defined as the spring in the upward and downward direction/the spring in the forward and rearward direction.

The transmission force is the force transmitted to the inner member 32 after a component in the direction of center axis C2, namely, in the upward and downward direction of the moment J applied from the rod section 40 to the large ring section 30 is absorbed by the spring in the upward and downward direction of the large ring elastic member 33, so that the transmission force decreases with decrease in the spring in the upward and downward direction. The transmission force per unit displacement is the transmission characteristics.

Further, since the moment J is connected with a large ring center-of-gravity distance L1 and a rod weight M, the rod length L is also an essential factor with respect to the transmission characteristics. Herein, the large ring center-of-gravity distance L1 is a distance between the fastening center CT1(a) of the large ring section 30 and a center of gravity WC. A small ring center-of-gravity distance L2 is a distance between the fastening center CT1(b) of the small ring section 20 and the center of gravity WC. In the drawing, a reference character CT2 designates the elastic center. In addition, while the reference character CT1 designates the fastening center, (a) and (b) are appended for distinguishing between the large ring side and the small ring side herein.

These principal parameters are different variously in accordance with the specifications prepared for each of vehicle models. However, the majority of these parameters are fixed automatically without relation to the transmission characteristics when concrete specifications of the vehicle body side are fixed. For example, the rod length L, the rod weight M, the center of gravity WC, the large ring center-of-gravity distance L1, the small ring center-of-gravity distance L2, the moment J, the large ring spring Ko and the small ring spring Kk are contained in such parameters.

On the other hand, as the transmission characteristic parameters which are the parameters for realizing specific transmission characteristics, there are the small ring torsion spring Kr and the large ring spring ratio R. Moreover, the small ring torsion spring Kr and the large ring spring ratio R are greatly influenced by the rod length L in relation to the transmission characteristics, so that the rod length L is also one of the transmission characteristic parameters. In addition, in order for making the above described inner member of round pipe usable, the large ring elastic center distance A is also contained in the transmission characteristic parameters.

Then, for concretely setting up the transmission characteristic parameters, first the principal parameters other than the transmission characteristic parameters are set up to initial values of the design. The initial values of the design are values which are adopted at the beginning of the design and correspond to average values being adopted for most of the torque rods. Based on the initial values of the design, a transmission characteristic map to be referred to later is prepared.

Next, the method of setting up the transmission characteristic parameters for realizing the transmission characteristic of less than 100 N/mm will be explained. First, the rod length of the principal parameters has a strong dependency upon the specifications of the vehicle, and so it is fixed at a predetermined value on the whole when the specifications of the vehicle is fixed. In the wake of this, the weight M, the center of gravity WC, the large ring center-of-gravity distance L1, the small ring center-of-gravity distance L2 and the moment J are fixed.

Then, first these parameters are fixed at initial values of the design. At the same time, the large ring spring Ko and the small ring spring Kk are fixed at the initial values of the design. (STEP 1)

In this condition, the small ring torsion spring Kr, the large ring spring ratio R and the large ring elastic center distance A remain unfixed. However, since the large ring elastic center distance A is the parameter that becomes necessary when using the round pipe for the inner member, it is fixed at an optional value as a temporary measure, and the small ring torsion spring Kr and the large ring spring ratio R are set up.

First, requirements for the durability of the small ring torsion spring Kr and the large ring spring ratio R are examined, and these parameters are narrowed down into a fixed range (STEP 2).

As shown in FIG. 4, the small ring torsion spring Kr is correlated with the transmission characteristics. Namely, when the large ring spring ratio R is fixed at a proper value, there is a tendency that the transmission characteristics increase with increase in the small ring torsion spring Kr. Therefore, the transmission characteristics can be decreased with decrease in the small ring torsion spring Kr.

However, the small ring torsion spring Kr is not able to be decreased without limitation, and when it is less than 1×N·m/deg, the durability is lessened, so that it is unsuited to practical use. Moreover, When it is more than 4×N·m/deg, the durability is satisfied but the transmission characteristics become 100 N/mm or more. Accordingly, the small ring torsion spring Kr has to fall within the range of 1×N·m/deg≤Kr≤4×N·m/deg.

Considering the relationship between the large ring spring ratio R and the durability, it is conceivable that durable models are those shown in FIG. 4(B) (the large ring spring ratio R Maximum=1.0) and FIG. 4(C) (the large ring spring ratio R Minimum=0.2), so that the large ring spring ratio R which is good in durability is within the range of 0.2≤R≤1. Herein, FIG. 4(B) shows the one that the large ring elastic member 33 is extended in the left and right directions in a straight line and the inner member 32 made of round pipe is located in the center of the large ring elastic member 33. The spring in the forward and rearward direction becomes minimum, and the large ring spring ratio R becomes 1.0. Then, the large ring elastic center distance A becomes 0 (zero).

FIG. 4(C) shows the one that the large ring elastic member 33 is extended rearwardly in a straight line from the inner member 32 located in the center. The spring in the forward and rearward direction becomes maximum, and the large ring spring ratio R becomes 0.2. Then, the large ring elastic center distance A becomes 18 mm (in the case where the free length of the large ring elastic member 33 is 36 mm), for example.

Accordingly, first, the small ring torsion spring Kr and the large ring spring ratio R are narrowed down within such ranges as above, from the perspective of the durability and the like.

Next, within the durable ranges of each of the small ring torsion spring Kr and the large ring spring ratio R the combination realizing the transmission characteristics of less than 100 N/mm is determined (STEP 3).

This is determined based on the previously prepared transmission characteristic map.

The transmission characteristic map is the one mapping the transmission characteristics when having changed the small ring torsion spring Kr and the large ring spring ratio R with respect to each of the rod lengths and each of the large ring springs. This mapping can be done by the experience by way of trial manufacture experiments or the like, mathematical operations by way of an electronic simulation or a specific model numerical expression, etc., and it can be predetermined as a universal.

The small ring torsion spring Kr and the large ring spring ratio R each are within the range narrowed down by the above STEP 2.

FIG. 5 shows this transmission characteristic map. In this example, there are shown six kinds of the transmission characteristic maps in which, in a certain fixed large ring spring (for example, 105 N/mm), the rod lengths are in the range of 100~225 mm at intervals of 25 mm. In each of these transmission characteristic maps, the large ring spring ratios R are changed in the vertical direction, and the small ring torsion springs Kr are changed in the horizontal direction. Each of combined columns between the large ring spring ratio R and the small ring torsion spring Kr is the transmission characteristics. In the representation of the columns, the transmission characteristics of less than 100 N/mm only are marked by hatching, and blank columns are the transmission characteristics of 100 N/mm or more. In addition, these transmission characteristic maps are prepared for each of the large ring springs and prepared further for each of the rod lengths with respect to a certain large ring spring.

Accordingly, when these large ring spring and rod length are fixed, the transmission characteristic map corresponding to these large ring spring and rod length is selected, and further, according to this selected transmission characteristic map, possible combinations between the small ring torsion spring Kr and the large ring spring ratio R are obtained. For example, in the case of the rod length of 225 mm, the column consisting of a combination between the large ring spring ratio R of 0.2 and the small ring torsion spring Kr of 1×N·m/deg is marked by hatching and shows that the transmission characteristics of this combination is less than 100 N/mm. Therefore, by the combination of these numerical values, it is possible to obtain the torque rod which is durable and has the flat characteristics such that the transmission characteristics are less than 100 N/mm.

By the way, the combinations of other numerical values between the small ring torsion spring Kr and the large ring spring ratio R each are blank columns. This means that the transmission characteristics are not less than 100 N/mm, and so such combinations are not suitable for the torque rod.

In the case where other rod lengths are selected, the combinations between the small ring torsion springs Kr and the large ring spring ratios R such that the transmission characteristics are less than 100 N/mm are selected in the transmission characteristic map corresponding to the selected rod length.

With the above method, by using the transmission characteristic map prepared for each of the large ring springs and each of rod lengths, the durable torque rod which has the flat characteristics can be easily obtained. In addition, when designing the torque rod by using the rod length, the small ring torsion spring, the large ring spring and the large ring spring ratio as the parameters, these parameters can be easily determined or fixed.

Next, the setting for making the inner member out of the round pipe will be explained. FIG. 6 shows a diagram in which the larger ring spring ratios R and the large ring elastic center distances A are plotted in such a manner that the inner member 32 is made of the round pipe and that the large ring spring ratio R and the large ring elastic center distance A are changed in the range from FIG. 4(B) to (C), in the setting that realizes the transmission characteristics of less than 100 N/mm by the above method with exception of the large ring spring ratio R and the large ring elastic center distance A. Black dots in FIG. 6 indicate actual values of the large ring spring ratio and the large ring elastic center distance with respect to the ones which realize the transmission characteristics of less than 100 N/mm and which have the inner member 32 made of the round pipe.

In FIG. 6, letting the large ring elastic center distance be the vertical axis, and the large ring spring ratio the horizontal axis, the correlation between the large ring spring ratio R and the large ring elastic center distance A are indicated.

Namely, the black dots are on the whole distributed in the range of the large ring spring ratios of 0.2~1.0 along the straight line of A=−23R+21. All the black dots enter within the pipe zone 60 (a region marked by hatching) bounded by the straight lines of A=−23R+20 and A=−23R+26 extending in parallel with the straight line of A=−23R+21. Accordingly, within this pipe zone 60, even if the inner member 32 of round pipe is used, the large ring elastic center distance A can be configured to fall within the range of being realizable as the shape of the torque rod and so the inner member 32 of round pipe becomes usable. Herein, although FIG. 6 shows an example of the inner member of round pipe, the angular or square pipe may be used similarly.

Accordingly, in the pipe zone 60, the large ring elastic center distance A corresponding to the large ring spring ratio R fixed by the STEP 3 is selected (STEP 4).

Thus, the round pipe member can be used for the inner member 32, and the torque rod which is realizable as the shape and has the flat characteristics can be obtained. Moreover, this torque rod is excellent in durability and low in price.

Figure 8:
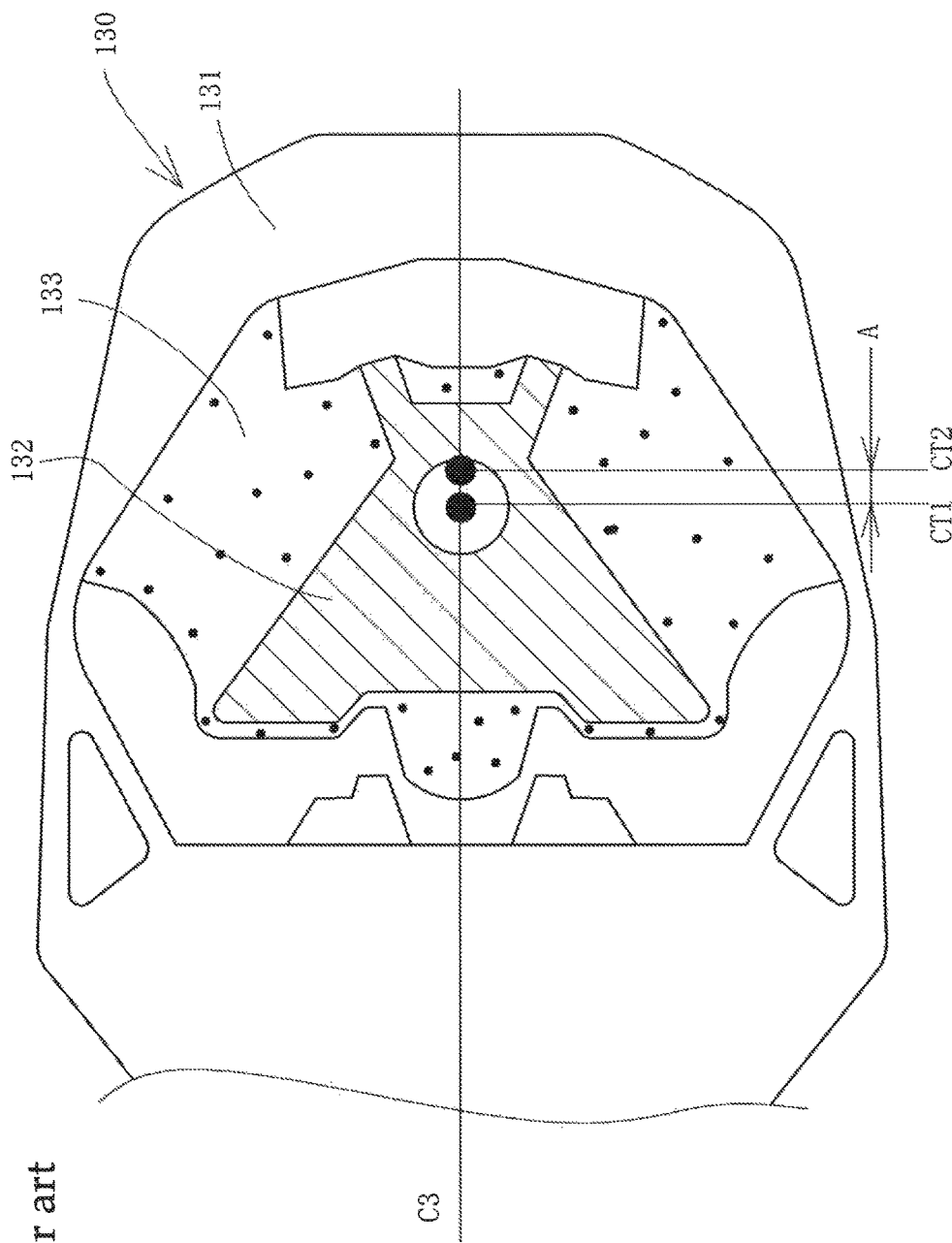
FIG. 8 is a view of a large ring section of a prior art example as seen in the axial direction of an inner member.
Figure 9:
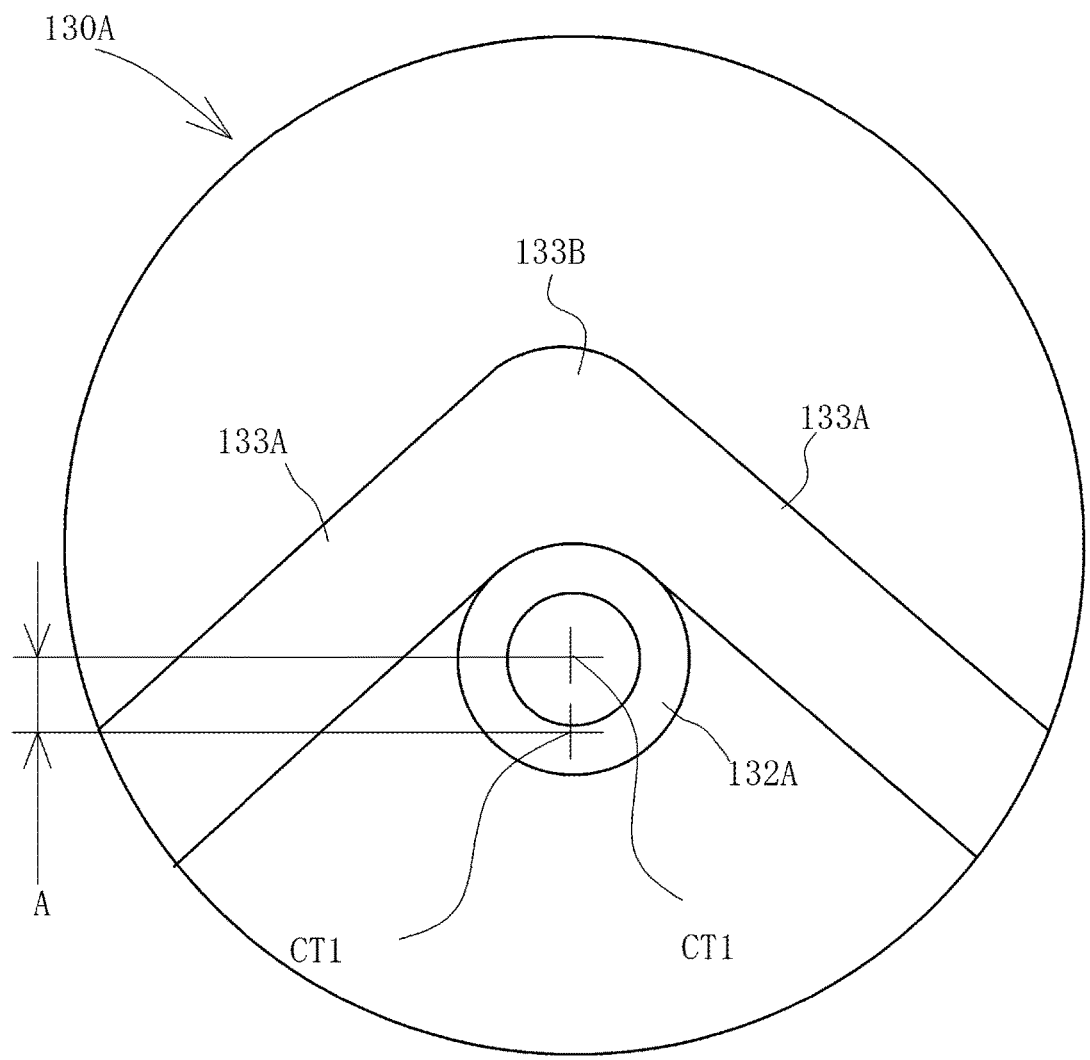
FIG. 9 is a view showing a condition not possible to be materialized in shape when using a round pipe.

By the way, a casting zone 61 shown in FIG. 6 is a zone of the large ring elastic center distance A and the large ring spring ratio R in the prior art example of FIG. 8. It is remote from the pipe zone 60, and the large ring elastic center distance A and the large ring spring ratio R each are located in the lower or smaller range.

This casting zone 61 is a predetermined circular zone formed with the large ring elastic center distance A=2.3 mm and the large ring spring ratio R=0.35 as its center and is the range to which the large ring elastic center distance A and the large ring spring ratio R of the torque rod having the structure of the prior art example shown in FIG. 8 belongs.

FIG. 7 shows a graph of the transmission characteristic. In the case where the parameters are set up according to each of the above STEPS, a peak P3 of the rigid body resonance according to the present invention becomes considerably low transmission characteristics of less than 100 N/mm. Due to such flat characteristics, the harsh noises of the vehicle body can be decreased remarkably. At the same time, in the case where the resonance point of the vehicle body are varied by the specifications, the resonance on the torque rod side is not required to be tuned in accordance with the changes in the specifications whereby the torque rod is rich in versatility.

In addition, the combination between the small ring torsion spring Kr and the large ring spring ratio R each of which is essential for realizing the flat characteristics and is difficult to be fixed can be easily fixed by using the transmission characteristic map. Moreover, it is possible to obtain the torque rod which has the flat characteristics and is durable.

Further, by selecting the combination between the large ring elastic center distance A and the large ring spring ratio R that falls within the pipe zone 60, it is possible to use the inner member 32 made of round pipe, so that the torque rod which is very durable, light in weight and reasonable in price can be easily obtained. In the case where the square or angular pipe other than the round pipe is used for example, it is also possible to obtain the same effect.

What is claimed is:

1. A torque rod comprising:
    a small ring section to be connected to an engine;
    a large ring section to be connected to a vehicle body;
    a rod section providing a connection between the small ring section and the large ring section;
    the small ring section including an outer member connected to the rod section, a small ring inner member to be connected to the engine, and a small ring elastic member providing a connection between the outer member and the small ring inner member, said small rind elastic member of the small rind providing a small rind torsion spring, which is generated by torsion applied to the small rind elastic member, when vibration of the engine is transmitted through the small rind section to the rod section; and
    the large ring section including an outer member connected to the rod section, an inner member to be connected to the vehicle body, and a large ring elastic member providing a connection between the outer member and the inner member, said large rind elastic member of the large rind section providing a large rind spring, which is generated by transmission of vibration from the rod section to the vehicle body side, said large ring spring including a first spring in an axial direction of the rod section and a second spring in an axial direction of the inner member;
    the torque rod produces a rigid body resonance due to vibration of the engine and transmits the vibration to the vehicle body,
    wherein transmission characteristics relative to a magnitude of transmission force transmitted from the large ring section to the vehicle body at a time of rigid body resonance of the torque rod, are such that a capacity of transmission force from the large ring section to the vehicle body at a resonance peak is less than 100N/mm,
    wherein transmission characteristic parameters for realizing the transmission characteristic of the torque rod include: the small ring torsion spring and a large ring spring ratio, which is a ratio the first spring to the second spring, when the vibration is transmitted from the rod section to the vehicle body.

2. The torque rod according to claim 1 wherein the inner member of the large ring section is made of pipe.

3. The torque rod according to claim 2, wherein the inner member of the large ring section is made of round pipe.

4. The torque rod according to claim 2, wherein the large ring spring ratio and a large ring elastic center distance (A), which is a distance between an elastic center of the large ring elastic member and a fastening center of the inner member with respect to the vehicle body, fall within a predetermined pipe zone and,
    wherein the pipe zone is a zone bounded by large ring spring ratios of R=0.2~1.0, a straight line of A=−23R+21 and straight lines extending in parallel with the straight line of A=−23R+21 in a graph representing the large ring elastic center distance (A) on a vertical axis and the large ring spring ratio on a horizontal axis.

5. The torque rod according to claim 1, wherein the outer member of the small ring section and the outer member of the large ring section are made of resin and formed integral with the rod section.

6. The torque rod according to claim 1, wherein the torque rod is arranged below the engine and used as a lower mount in which the outer member of the large ring section receives force in such a way as to be moved relatively forwardly with respect to the inner member by vibrations of the engine and wherein the large ring elastic member is formed integral with the inner member and has a forwardly projecting configuration of substantially V-shape.

7. The torque rod according to claim 1, wherein a center axis of the small ring section and a center axis of the large ring section are inclined to each other at an angle of 90°.

8. The torque rod according to claim 3, wherein the large ring spring ratio and a large ring elastic center distance (A), which is a distance between an elastic center of the large ring elastic member and a fastening center of the inner member with respect to the vehicle body, fall within a predetermined pipe zone, and
    wherein the pipe zone is a zone bounded by large ring spring ratios of R=0.2~1.0, a straight line of A=−23R+21 and straight lines extending in parallel with the straight line of A=−23R+21 in a graph representing the large ring elastic center distance (A) on a vertical axis and the large ring spring ratio on a horizontal axis.

9. The torque rod according to claim 2, wherein the outer member of the small ring section and the outer member of the large ring section are made of resin and formed integral with the rod section.

10. The torque rod according to claim 3, wherein the outer member of the small ring section and the outer member of the large ring section are made of resin and formed integral with the rod section.

11. The torque rod according to claim 4, wherein the outer member of the small ring section and the outer member of the large ring section are made of resin and formed integral with the rod section.

12. The torque rod according to claim 2, wherein the torque rod is arranged below the engine and used as a lower mount in which the outer member of the large ring section receives force in such a way as to be moved relatively forwardly with respect to the inner member by vibrations of the engine and wherein the large ring elastic member is formed integral with the inner member and has a forwardly projecting configuration of substantially V-shape.

13. The torque rod according to claim 3, wherein the torque rod is arranged below the engine and used as a lower mount in which the outer member of the large ring section receives force in such a way as to be moved relatively forwardly with respect to the inner member by vibrations of the engine and wherein the large ring elastic member is formed integral with the inner member and has a forwardly projecting configuration of substantially V-shape.

14. The torque rod according to claim 4, wherein the torque rod is arranged below the engine and used as a lower mount in which the outer member of the large ring section receives force in such a way as to be moved relatively forwardly with respect to the inner member by vibrations of the engine and wherein the large ring elastic member is formed integral with the inner member and has a forwardly projecting configuration of substantially V-shape.

15. The torque rod according to claim 5, wherein the torque rod is arranged below the engine and used as a lower mount in which the outer member of the large ring section receives force in such a way as to be moved relatively forwardly with respect to the inner member by vibrations of the engine and wherein the large ring elastic member is formed integral with the inner member and has a forwardly projecting configuration of substantially V-shape.

\* \* \* \* \*